Feb. 19, 1929.
W. A. WALTERS
1,702,528
APPARATUS FOR THE MANUFACTURE OF PRINTERS' LEADS OR SLUGS
Filed July 1, 1927
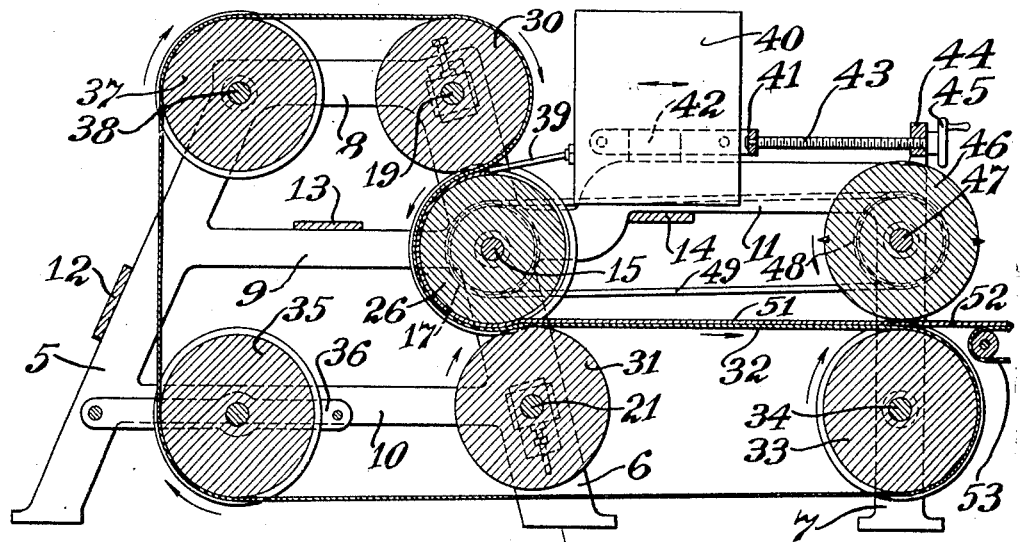
Fig. 1
Fig. 2
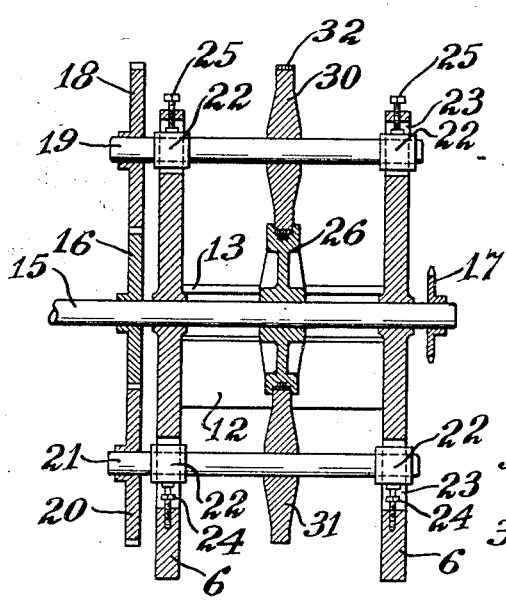
Fig. 3
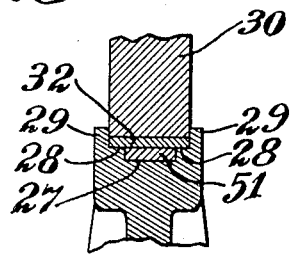
Fig. 4
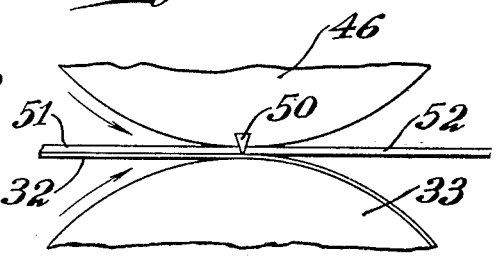
Inventor
W. A. Walters
By
Attorney Patented Feb. 19, 1929.

1,702,528

UNITED STATES PATENT OFFICE.

WILLIAM ANTHONY WALTERS, OF BIRMINGHAM, ALABAMA, ASSIGNOR OF ONE-HALF TO SIMMONS L. CHEEK, OF BIRMINGHAM, ALABAMA.

APPARATUS FOR THE MANUFACTURE OF PRINTERS' LEADS OR SLUGS.

Application filed July 1, 1927. Serial No. 202,913.

My invention relates to an apparatus for the production of cast slugs or leads for printers' use, and relates to that type of machine in which an endless metal band co-acts with a grooved mold roll to form what may be termed a continuous mold into the top of which the molten metal is fed in a graduated manner so as to maintain the moving mold cavity filled with the molten metal.

One feature of my invention relates to the mold roll itself which is formed with a shouldered recess deep enough to receive and center both the traveling mold band as well as tensioning rolls that hold the band pressed firmly against the bottom of the recess where it forms the outer half of the mold.

Another feature of my invention relates to the provision of idlers which conduct the mold band forwardly from the mold roll so as to convey and deliver the finished molded lead to a cutter which severs it into the desired lengths.

My invention further contemplates a very simple and effective means for adjusting the container for the molten metal so as to bring its discharge spout into proper relation with the molded wheel.

My invention further contemplates the provision of an idler adapted to maintain the tension on the endless mold band that co-acts with the mold roll and forms the outer or top half of the mold.

My invention further contemplates the utilization of a rotating cutter which co-acts with the flight of the endless mold band, serving as a conveyor for the molded article, to cut the latter into lengths and which is suitably geared to the mold roll so that it travels in positive relationship therewith and with equal peripheral speed.

My invention contemplates conveying the molded article in strip form as it leaves the mold roll on the endless band far enough to permit the molded article to solidify sufficiently for cutting before it is engaged by the cutting wheel.

My invention further contemplates the novel details of construction and arrangements of parts, which, in their preferred embodiment only are illustrated in the accompanying drawings which form a part of this specification, and in which:—

Fig. 1 is a vertical cross-sectional view taken through the longitudinal center of the machine with the melting pot shown in elevation.

Fig. 2 is a sectional view taken on the line II—II of Fig. 1.

Fig. 3 is an enlarged cross-sectional view of the mold showing the molded article therein.

Fig. 4 is a fragmental view in side elevation of the cutting and conveying mechanism for the molded material.

Similar reference numerals refer to similar parts throughout the drawings.

In the embodiment of my invention illustrated, I show the apparatus formed by a pair of side frames comprising rear legs 5, intermediate legs 6 and forward legs 7 which rest upon a suitable support and are connected by longitudinal members 8, 9, 10 and 11. the latter connecting the legs 6 and 7. The side frames are suitably cross connected by transverse brace members 12, 13 and 14, thus providing an open-work frame of light structure and inexpensive to make in which the moving parts that will now be described can be suitably mounted.

In the frame legs 6 near the center I mount a drive shaft 15 which at one end is connected to any suitable source of power, not shown, and carries fast thereon on one side of the frame a gear 16 and on the other side a sprocket wheel 17. The gear 16 is adapted to mesh overhead with a gear 18 fast on a shaft 19 and below it meshes a gear 20 fast on the shaft 21. The shafts 19 and 21 turn in bearings 22 which are mounted in slots 23 provided in the legs 6 and are made adjustable towards each other by adjusting screws 24 and 25. The meshing teeth on the gears 16, 18 and 20 are long enough to permit of the necessary relative adjustment of the shafts 19 and 21 to the shaft 15. I mount on the shaft 15 centrally of the frame an annular mold roll 26 having formed therein an annular mold cavity 27 of such cross-section as may be desired, that shown being rectangular, which cavity is disposed between the shoulders 28 which form the sides of the mold and which terminate flush with the base of the annular side flanges 29 which receive snugly between them the peripheries of the presser rolls 30 and 31 which are mounted respectively on the shafts 19 and 21. The peripheral edge of each of these rolls 30 and 31 is adapted to bear against an endless flexible mold band 32 which fits snugly between the flanges 29 so as not to have play laterally. This band, after passing forwardly from between the mold roll and presser roll 31 is carried forwardly horizontally about an idler 33, rotatable on a fixed shaft 34 connecting the forward frame legs 7. The band 32 thence returns and passes under a tension idler 35 mounted in a hanger frame 36 hinged to the rear legs 5 and thence passes up over an idler 37 which is grooved and rotatably mounted on the fixed shaft 38 that connects the rear legs 5. From the idler 37 the band passes over the presser roll 30 and thence about the mold roll for an arc of about 180° and thence continues in the cycle hereinabove described. The mold roll has its forward half left exposed and the mold cavity 27 being formed between its other half and the endless band and into this cavity at the top of the mold I introduce the molten metal through a nozzle 39 which is connected to the melting pot 40 containing the molten metal to be used for casting the leads, slugs or strip material. The melting pot is mounted on a U-frame 41 having bearing blocks 42 thereon adapted to rest slidably on the top edges of the frame members 11. An adjusting screw 43 has a swivel connection to the frame 41 at its center and is in threaded engagement at its outer end with an upturned lug 44 at the forward end of the frame member 11. A hand wheel 45 fast on the screw 43 provides for the ready adjustment of the melting pot toward and from the mold wheel so as to bring the nozzle into correct pouring position.

The mechanism for cutting the molded strip into sections comprises a cutter disk 46 mounted fast on a shaft 47 which is journaled in the forward frame legs 7 and carries at one end a sprocket wheel 48 driven from the sprocket wheel 17 by a sprocket chain 49. The cutter disk has a diameter equal to the inner diameter of the mold cavity and the sprockets also have a like diameter whereby I positively drive the cutter disk with the same peripheral speed as that of the bottom of the mold. I mount in the periphery of the cutter disk 46, cutters 50, of which there may be as many as desired, according to the length into which the molded material is to be cut. As shown, the cutter disk is provided with two cutter blades equidistantly spaced and its diameter is such that these blades will cut the molded strip into 24" lengths which is a standard for printers' leads and slugs. That portion of the endless band 32 extending from the mold roll to the idler 33 provides a span of sufficient length to permit the exposed molded strip lying thereon to cool and harden sufficiently for the cutting operation and thus avoids any transfer of the strip while fragile to any conveying mechanism.

In operation, having assembled the mechanism in the manner described and having adjusted the melting pot to the correct position, the drive is started and as the mold roll turns the presser rolls 30 and 31 turn therewith and press the endless band 32, which is held under tension by the idler 35, firmly against the shoulders 28 and thus provide a tight closure for the outer half of the mold. The mold thus provided is a traveling mold and into the upper portion thereof is directed a stream of molten metal which will solidify therein before it reaches the lower presser roll 31 so that the hardened metal itself forms the end closure of the mold and the nozzle will feed the molten metal just fast enough to keep the cavity filled up. As the mold roll turns and the molded strip 51 passes off lying on top of the endless band 32 it will ride thereon until it cools by which time it reaches the idler 33 and cutter disk 46, where it is cut into standard lengths described to form leads or slugs 52 which are delivered to a conveyor or stacker 53 disposed close enough to the idler 33 to support the outer end of a slug before it is cut off. It will be noted that I employ a considerable length of band not only to serve as a conveyor to lead the molded strip to the cutter, but also to provide a sufficient length of bands so that a portion thereof after leaving the mold roll will be thoroughly cooled before again coming into contact with the mold roll, and thus I avoid the necessity of having to cool the mold because if the outer band is sufficiently cold it will itself chill the metal and the mold wheel will not get hot enough to prevent the metal chilling before reaching its discharge point. The design of the mold wheel 26 is such as to avoid undue storage of heat therein and to provide ample radiating surface.

The provision of the conveying portion of the flight of the band has one important function in that it will receive the thin delicate strip of metal which occurs when starting up and stopping the molding operation and will conduct this delicate strip to the cutter disk until the full sized molded strip appears. Where a conveyor is not provided the handling of this delicate initial and terminal molded material is a very serious problem.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A molding machine of the character described, comprising an endless band, a grooved mold roll adapted to coact with said band throughout a portion of its periphery to form a traveling mold, and means utilizing the band to form a conveyor for the molded strip.

2. A molding apparatus according to claim 1, in combination with a cutter adapted to act on the molded strip while carried by said band as a conveyor.

3. A molding apparatus according to claim 1, in combination with a cutter adapted to act on the molded strip while carried by said band, said cutter being rotatable, and positive drive means for rotating it in synchronism with the mold wheel.

4. A molding apparatus according to claim 1, in combination with a cutter adapted to act on the molded strip while carried by said band, said cutter being rotatable, and positive drive means for rotating it in synchronism with the mold wheel, the inner diameter of the mold and the outer diameter of the cutter being equal.

5. A molding machine of the character described, comprising an open frame having near its center an annular mold roll, a plurality of guides at both ends and near the center of the machine about which an endless band is passed by which it is guided about a portion of the periphery of the mold roll, said band being elongated and having an extensive free flight travel for effectively cooling it after co-acting with the mold roll to form a mold.

6. A molding apparatus of the character described, comprising a mold roll having an annular mold, an endless band co-acting with a portion of the periphery of said roll to form a traveling mold, guides for said endless band adapted to give it a substantial flight apart from the mold roll, the said band throughout a portion of its flight serving as a conveyor for the molded strip, a cutter disk corresponding in diameter with the mold roll and adapted to co-act with the molded strip, and a positive driving connection for rotating the cutter with the same peripheral speed as the mold.

7. A molding apparatus of the character described comprising a mold roll having an annular mold, an endless band coacting with a portion of the periphery of said roll to form a traveling mold, and a cutter disk driven in synchronism with the mold roll and adapted to coact with the molded strip.

8. A molding apparatus of the character described comprising a mold roll having an annular mold, an endless band coacting with a portion of the periphery of said roll to form a traveling mold and serving throughout a portion of its flight as a conveyer for the molded strip, and a cutter disk driven in synchronism with the mold roll and adapted to coact with the molded strip.

9. A molding apparatus of the character described comprising a mold roll having an annular mold, an endless band coacting with a portion of the periphery of said roll to form a traveling mold and serving throughout a portion of its flight as a conveyer for the molded strip, an idler roller for the conveyer portion of the band, and a cutter disk driven in synchronism with the mold roll and coacting with the molded strip and the idler roller to cut the strip into predetermined lengths.

In testimony whereof I affix my signature.

WILLIAM ANTHONY WALTERS.